United States Patent Office

3,227,781
Patented Jan. 4, 1966

3,227,781
PROCESS OF CHLORINATION OF HIGHLY CRYSTALLINE POLYETHYLENE AND PRODUCT THEREOF
Helmut Klug and Karl-Heinz Mittelberger, Gersthofen, near Augsburg, Germany, assignors to Farbwerke Hoechst Aktiengesellschaft vormals Meister Lucius & Bruning, Frankfurt am Main, Germany, a corporation of Germany
No Drawing. Filed Sept. 17, 1958, Ser. No. 761,454
Claims priority, application Germany, Sept. 28, 1957, F 24,050
18 Claims. (Cl. 260—897)

The present invention relates to a process for the manufacture of chlorinated polyethylene and is a continuation-in-part of application Serial No. 643,499, filed March 4, 1957, now abandoned.

Various processes are known for chlorinating polyethylenes obtained by the high pressure process. The simplest of these processes consists in dissolving these polymers in the inert organic diluents, such as carbon tetrachloride, and subsequently chlorinating them. It has also been proposed to bring aqueous dispersions of high pressure polyethylenes, if desired the emulsions obtained in the course of special polymerization processes, into contact with chlorine under atmospheric pressure; however, no details are known as to the degree of uniformity of the products so obtained.

It is known that even the chlorination in solution, that is to say the simplest of the above-mentioned methods, is beset with considerable difficulties in the case of low pressure polyethylenes, particularly if the latter have been obtained with the use of organo-metal compounds in the presence of reducible heavy metal compounds. This is due, inter alia, to the fact that contrary to high pressure polymers, the low pressure polymers are essentially less compatible in all stages of the chlorination with the usual organic solvents, such as carbon tetrachloride, chloroform or pentachlorethane, owing to their preponderantly linear molecular structure and since they consequently consist substantially of crystallites (cf. Ind. Eng. Chem. 1955 IV, 11A) and also since their molecular weight is greater than that of the high pressure polymers extending up to 2,000,000. The presence of large quantities of solvents the cost of which is hardly justifiable is, therefore, indispensible especially if uniform chlorination products are to be obtained. On the other hand, attempts to carry out the chlorination in the presence of water (emulsion polymerization is not applicable to low pressure polymers of the kind described here) are limited to systems obtained by subsequent dispersion of polyethylenes which have been completely polymerized. As experiments have shown, these systems, however, react but slowly if the treatment with chlorine is carried out according to the known process for chlorinating high pressure polyethylenes under normal pressure. For example, the chlorination of a low pressure polyethylene, suspended in water, under normal pressure to a chlorine content of 7.7% (molecular weight 12,000 to 15,000, size of the individual grains 10 to 20 $\mu$) takes 22 hours and requires about a thirty-twofold excess of chlorine.

Now we have found that satisfactory products of a relatively uniform degree of chlorination can be obtained from aqueous suspensions of low pressure polyethylenes with a simultaneous quantitative utilization of chlorine by carrying out the halogenation under a constant excess pressure of chlorine. No formation of lumps so troublesome in the chlorination of dispersions of high pressure polyethylenes takes place as the reaction proceeds, even at temperatures of 65° C. or more. Especially uniform chlorination products are obtained, this being surprising, if the chlorination is carried out in the presence of a hydrocarbon containing at least 6 carbon atoms, which hydrocarbon may be of aliphatic, cycloaliphatic and/or aromatic nature and which may be added in a quantity up to 100%, preferably between 10 and 50%, calculated upon the polyethylene. If desired, the said hydrocarbons are completely or partly replaced by products which have been obtained by chlorinating the above-mentioned hydrocarbons to a more or less high degree, for example to an extent of 50%. These substances are obviously very favorable since they wet the polyethylene or cause it to swell to a small extent and thus promote the diffusion of the chlorine. Depending on the intended use of the chlorinated final products, the said substances may be left in these products or may be removed therefrom in a simple manner, for example by extraction.

For the process of the invention there are generally used polyethylenes of a molecular weight of above 12,000, especially of from 20,000 to 2,000,000, and preferably from 60,000 to 200,000. Under certain circumstances, polyethylenes of a lower molecular weight may, however, also be used. The use of a polyethylene of an individual grain size from above 30$\mu$ to 300$\mu$ is of particular technical interest since in many cases the low pressure polyethylene obtained under normal conditions contains a more or less large portion of polyethylene of a grain size of more than 30$\mu$. Preparatory comminuting or sorting of the material prior to the chlorination, for example by grinding, sieving or air separation, can be dispensed with.

The chlorination process according to the present invention is not only suitable for low pressure polyethylenes produced under the catalytic action of organo-metal compounds in the presence of reducible heavy metal compounds, but also for other low pressure polyethylenes produced, for example, in the presence of molybdenum oxides or other oxides of metals of subgroup VI of the Periodic Table.

The chlorination may, for example, be carried out as follows:

The powdery low pressure polyethylene, the diameter of the individual grains of which is between 0.1 and 300$\mu$, preferably 0.1 and 100$\mu$, but may also range only from 0.1 to 30$\mu$, is suspended, if desired with the addition of emulsifiers and catalysts, such as radical-forming substances, or heavy metal salts, in 3 to 30 times the amount of water to which electrolytes, such as acids and/or salts, may have been added. Subsequently the air still present in the apparatus is displaced by appropriate measures, for example by means of chlorine. It is of advantage to operate under a pressure of chlorine of 0.1 to 10 atmospheres (gauge); if desired, a higher excess pressure of chlorine may be applied. The suspension is put in motion as intensively as possible, for example by shaking or stirring, in order to obtain a good contact between the gaseous and the liquid phase. The temperature is to be selected as set forth hereinafter.

In this manner chlorinated polyethylenes having a chlorine content of up to 70% or more are obtained in a simple manner, especially if the reaction is accelerated by the action of short wave light or another active radiation source. The course of the reaction which may also be carried out continuously or in the form of a cascade process, is determined by means of the quantity of hydrogen chloride absorbed by the aqueous phase, and as soon as the desired quantity of chlorine is absorbed by the product the reaction is interrupted. The product is separated from the accompanying hydrochloric acid by filtration, washed with water, dried and, if desired, stabilized; modifications, such as adding the stabilizer such as urea, sodium carbonate, sodium hydrogen carbonate, ammonium carbonate, alkali phosphates at an earlier moment, for example before drying or together with the wash water, are, however, also possible.

It is, of course, also possible to add the hydrocarbons or their chlorination products already mentioned above as additives in the quantitative proportions also given above and then to carry out the chlorination proper in the presence of catalysts, emulsifiers and/or luminous energy, for example with application of short wave radiation, such as ultra-violet light.

The addition of catalysts is of advantage for the chlorination in both temperature ranges. There come into consideration, among others, peroxides, such as benzoylperoxide, toluylperoxide, chlorobenzoylperoxide, lauroylperoxide, cyclohexanoneperoxide; azonitriles, such as azodiisobutyronitile. As emulsifiers there can be used, for example, alkylarylsulfonates or alkylsulfonates.

Concerning the temperature to be applied, various possibilities exist. When operating at a temperature ranging from 50 to 100 or 110° C. or preferably from 65 to 100 or 110° C., a hard powder of chlorinated polyethylene is obtained which has almost the same structure as the starting material and consists mainly of crystallites. At a temperature above 100 or 110° C., and advantageously not exceeding 150° C., products of different kind are obtained which differ fundamentally in their physical behavior from those obtained at the above-mentioned lower temperature, this being surprising, and contrary to them are flocculent to amorphous and, depending on the chlorine content, constitute rubber-like to hard substances. Contrary to the chlorination products obtained at the said lower temperatures, they can furthermore be dissolved or swelled to a higher extent in a number of solvents. This effect is surprising and could not be expected.

It is furthermore possible and has proved of special advantage when proceeding at a working temperature above 100 to 110° C., to carry out the chlorination in the presence of inert substances of inorganic or organic chemical nature which have been selected so that they can be maintained in the final product. In this manner the slight agglomeration of the starting material which may occur in the first stage of the chlorination is completely avoided and the reaction product is obtained in a finely flocculent and friable state suitable for the work-up.

As inert substances the following inorganic substances may, for example, be used: silicic acid or kieselguhr, barium sulfate, powdered asbestos, titanium dioxide, graphite, silicon carbide or glass powder. As organic substances there come primarily into consideration plastics which consist of halogen and carbon and, if desired, hydrogen but contain at least 1 halogen atom per 4 carbon atoms, such as polyvinyl chloride, polyvinylidene chloride, polychloroprene, polytetrafluoroethylene, polytrifluorochlorethylene, or copolymers of monomers used for making the above polymers, for example copolymers of vinyl chloride-vinylidene chloride. There may also be used plastics which, if desired, are further chlorinated under the reaction conditions. In order to obtain a good homogeneous distribution on the inert carrier of the product to be chlorinated, the polymerization of ethylene into polyethylene may already be carried out in the presence of the above-mentioned substances; it is furthermore possible to apply the polyethylene to the carrier by means of a selective solvent. In the temperature range above 100 or 110° C. the chlorination is generally also carried out as described above, care must, however, be taken that the water is not evaporated at the temperatures applied. It is also possible to add more or less large quantities of electrolyte to the water, as well when chlorinating below 100 to 110° C. as above said temperature. By such an addition the boiling point of the aqueous phase is raised, so that, if desired, it is possible to work under relatively low pressures. According to the invention there are applied pressures of chlorine of above 0.1 atmosphere (gauge) and generally below 10 atmospheres (gauge); if desired also higher pressures of chlorine, for example 20 atmospheres (gauge) may be applied. Any hydrogen chloride which has not been dissolved by the system can be expanded continuously or discontinuously.

If polyethylene or the chlorinated products obtained at temperatures below 100 or 110° C. are heated under pressure in an aqueous suspension to an elevated temperature, for example to 120° C., the material remains unchanged and sticks together only slightly even after a treatment of 15 hours and possesses about the same physical properties as before the heat treatment. If, however, under the same conditions but only after a temperature of 100 to 110° C. has been reached, chlorine is introduced into the suspension, slight coagulation is noticed after few minutes to a few hours. The velocity of this agglomeration is dependent on the chlorine content of the chlorination product. As the introduction of chlorine proceeds, the product gradually becomes gel-like and almost transparent and after filtration, washing and drying shows the above-mentioned properties. This proves that the conversion into the elastic state is not produced by the action of elevated temperatures alone but by the simultaneous presence of chlorine.

We have furthermore found that the two embodiments concerning the application of temperatures below 100 to 110° C. and above that temperature may be combined and chlorinated polyethylene can be obtained in an improved form as regards the uniformity and the mechanical properties, for example, the solubility, when the chlorination of the low pressure polyethylene is started at a temperature below 100 to 110° C. and preferably above 50° C. and then continued with gradual or stepwise increase of the temperature to above 100 to 110° C. and preferably below 150° C. By this mode of operation an agglomeration of the polyethylene grains to larger conglomerates is practically avoided.

It is of advantage to suspend the powdery low pressure polyethylene in 3 to 30 times the amount of water to which electrolytes may have been added as described above, and to contact the suspension which has been well stirred with chlorine, preferably after the removal of atmospheric oxygen present in the interior of the apparatus.

By a moderate heating or cooling care may be taken that the reaction temperature, which, at the beginning, preferably ranges from 50 to 100–110° C., does not exceed 110° C. The temperature is then increased gradually or stepwise as soon as the reacted material has a chlorine content of at least 10, preferably 25 to 65% by weight.

Thus there is first obtained a hard powder mainly consisting of a crystallites that, due to the higher softening point with respect to the starting material, can endure without difficulty a further increase in temperature to 100–110° C. and above, which enables amorphous to flocculent chlorination products to be obtained.

The temperature limit at which powdery chlorination products consisting of crystallites are no longer formed but flocculent amorphous products are obtained instead is not completely distinct neither if polyethylene itself nor chlorinated polyethylene is chlorinated. It depends to a small degree on the molecular weight of the polyethylene used, i.e. the smaller the molecular weight the lower is the temperature limit. In the present specification the temperature limit is, therefore, indicated as being within the range of 100 to 110° C.

When the chlorination is terminated at temperatures above 100 to 110° C. as described above the reaction product is obtained in the form of a friable and, according to the chlorine content, rubber-like or hard powder. It may be separated from the solution containing hydrochloric acid and possibly other electrolytes by a conventional method, for example, filtration or centrifugation. For the further purification the product can be repeatedly washed with water and after-washed, if desired, with water-compatible organic solvents, for example, methyl alcohol, and then dried at normal or under reduced pressure.

It is possible, of course, to add in the first as well as in the second working phase of this embodiment limited amounts of the hydrocarbons mentioned above which are liquid under the reaction conditions, or the chlorination products thereof, and to work in the presence of catalysts, emulsifiers and/or irradiation with light.

An amount of electrolyte may be added in the second phase if this has already been done in the first one. It is likewise possible to separate and to isolate the product obtained in the first reaction phase prior to the further chlorination at a temperature above 100 to 110° C. It is surprising that already a short treatment with chlorine at a temperature in the range above 100 to 110° C. improves the properties of the chlorination product. A low pressure polyethylene chlorinated, for example, at a temperature of less than 100 or 110° C. to a chlorine content of 59% satisfactorily dissolves in low molecular chloro-hydrocarbons only with the application of heat whereas at room temperature the product is only swollen to a larger or smaller extent. By the absorption of 1% of chlorine or even less above the temperature limit mentioned, products are obtained which are soluble in said solvents in the cold practically to any extent.

Depending on their halogen content, the chlorinated low pressure polyethylenes obtained by the process of the invention can be used, for example, as raw materials for lacquers or foils: They can further be used, alone or in combination with other high polymers, for the production of materials of low inflammability and are suitable for a plurality of further purposes.

As already mentioned above, there are obtained by the chlorination at a temperature above 100 to 110° C. substances which in part are to a high extent elastic and which also possess further valuable properties. Besides the fields of application given above, they can be used, for example, as substitutes for caoutchouc, for the production of coating materials and especially as highly polymeric plasticizers in combination with other, preferably chlorinated—especially artificial—plastics with which they are particularly well compatible.

As will be clear from the above the application of the products obtained by the process of the invention depends on the chlorine content. For example, a product having a chlorine content of 30–50%, preferably 35–45%, is particularly suitable in the field of high molecular plasticisers or elasticisers, as substitutes for rubber and in the working up of artificial plastics in combination with other plastic materials, if desired, for the improvement of the mechanical properties. Considerably harder products having a chlorine content of 50–70 and preferably 55–65% are particularly suitable in the field of lacquer resins either alone or in combination.

The following examples serve to illustrate the invention but they are not intended to limit it thereto, the parts being by weight.

EXAMPLE 1

Into an enamelled pressure resistant vessel provided with a stirrer, a source for ultraviolet light, an inlet pipe for the chlorine and a pressure valve there are introduced 250 parts of fine-grained low pressure polyethylene of an average molecular weight of 20,000 (size of the individual grains 15μ) and 750 parts of distilled water to which 15 parts of sodium polychloralkanesulfonate (chlorine content 37%) have been added as emulsifier. To the mixture so obtained 0.75 part of benzoylperoxide is added as catalyst and after the air still present in the interior of the apparatus has been displaced, the chlorine is introduced under pressure with a gradual increase in temperature to 70° C.

With a relatively constant absorption of chlorine a hard fine-grained and snow-white powder (37.9% of chlorine) is obtained in the course of 38 hours. The powder is separated by filtration from the aqueous hydrochloric acid of about 17% strength which has been formed, washed with water, dried and freed in the state of suspension from still adhering residues of hydrogen chloride by intensive blowing with air. As results from the precipitation analysis, the final product so obtained is to a far extent uniform (the chlorine contents of the individual fractions range from 30 to 42%) and completely free of nonchlorinated constituents. Contrary to the nonchlorinated starting material the said product is well soluble, especially under heated conditions, in chlorinated hydrocarbons of low or high molecular weight, for example carbon tetrachloride, trichlorethylene or chloroparaffins.

EXAMPLE 2

In the apparatus described in Example 1, gaseous chlorine is pressed on 250 parts of a fine-grained low pressure polyethylene of an average molecular weight of 100,000 to 120,000 which has been suspended in 700 parts of water and well stirred. There are added 0.75 part of azo-isobutyronitrile as catalyst and 16 parts of sodium alkyl-benzenesulfonate as emulsifier. By means of a pressure regulator the pressure is adjusted to 0.3 atmosphere (gauge). After 59 hours of chlorination at 70° C., the absorption of chlorine amounts to 25%. The snow-white final product which has been freed of still adhering hydrochloric acid by filtering with suction is washed with water and, for the purpose of stabilization, with a urea solution of 2% strength, and dried. The said product is free of nonchlorinated constituents and has a good flame-resistant effect in spite of its relatively low chlorine content. When using double the luminous energy and carrying out the chlorination at a temperature between 25 and 50° C., a product containing 47.7% of chlorine is obtained already after 2 hours.

EXAMPLE 3

150 parts of a low pressure polyethylene of a medium molecular weight of 20,000 are mixed with 50 parts of a prechlorinated synthetic hydrocarbon (obtained by the hydrogenation of carbon monoxide to yield a hydrocarbon having a boiling range of 150 to 230° C. and subsequent chlorination of the hydrocarbon to a chlorine content of 40%), 5 parts of emulsifier (sodium polychloralkane-sulfonate, chlorine content 37%) and 0.8 part of benzoyl-peroxide as catalyst, and subsequently suspended in 3,500 parts of water. The chlorination is started as described in Example 1 and is finished after a total of 27 hours at 70° C., a snow-white hard powder having a chlorine content of 62.2% being obtained. The product is well soluble in chlorinated hydrocarbons, aromatic hydrocarbons or esters. During the entire course of the reaction the product shows no tendency of forming lumps in spite of the presence of the low molecular chloroparaffin portion which is adhesive in itself.

A part of the chlorinated final product is freed from chloroparaffin by extraction with ether and divided into several fractions by precipitation from homogeneous solution.

The product has the following composition:

| No. of the fraction | Percentage | Chlorine content, percent |
| --- | --- | --- |
| 1 | 10.2 | 61.5 |
| 2 | 3.2 | 60.0 |
| 3 | 64.1 | 61.1 |
| 4 | 11.6 | 60.3 |
| 5 | 10.9 | 61.1 |

The above table clearly shows that the individual fractions have approximately the same chlorine content.

EXAMPLE 4

In a 5 times tubulated round-bottom flask of a capacity of 4 liters which is provided with a stirrer, inlet pipe, reflux condenser with throttle valve, thermometer and quartz socket for the installation of an ultraviolet lamp, 3 liters of a calcium chloride solution of 50% strength are heated to 110 to 115° C. 200 grams of a polyethylene of a molecular weight of about 110,000 are introduced while stirring, and after a temperature of 115 to 120° C. has been reached, chlorine gas is introduced, under a feeble superatmospheric pressure (0.3 atmosphere (gauge)), into the thoroughly whirled reaction mass which is exposed to ultra-violet light, the hydrogen chloride formed being allowed to escape continuously at the outlet side for the exhaust gas. During this procedure a constant pressure of about 0.3 atmosphere (gauge) is to be maintained in the apparatus.

After 72 hours the material consisting of individual particles of caoutchouc-like elasticity is suction-filtered, washed with water until free of chlorine ions and dried. The product has a chlorine content of 47.5%. It is soluble in trichlorethylene and aromatic hydrocarbons and, contrary to the polyethylenes chlorinated at temperatures below 100 or 110° C., also in esters, such as ethyl or butylacetate.

EXAMPLE 5

In an apparatus as described in Example 4 but containing no radiation device, 43.2 grams of a polyethylene of an average molecular weight of 70,000 which has been mixed with 156.8 grams of polyvinyl chloride (55.8% of chlorine) are introduced, while stirring, at 115° C. into 1800 grams of calcium chloride solution of a density of $d_4^{20}$ 1.423. After addition of 0.1 gram of benzoylperoxide, chlorine is introduced for 6¼ hours at about 0.3 atmosphere (gauge). The product is suction-filtered, washed and dried at 50° C. It has a chlorine content of 51.8% and possesses marked elastic properties.

EXAMPLE 6

100 grams of a product consisting of polyethylene of an average molecular weight of 70,000 which has been applied to polyvinyl chloride and containing 43.6% of chlorine are chlorinated under the conditions described in Example 5 in 900 grams of calcium chloride solution to which 0.05 gram of benzoylperoxide has been added as catalyst. After 16 hours of chlorination, the product is suction-filtered, washed and dried. It has a chlorine content of 51.2%, including the 42.1% contributed by the polyethylene portion.

EXAMPLE 7

A reaction vessel as described in Example 1, resistant to pressure and corrosion and provided with an ultraviolet burner, inlet pipe for the chlorine and pressure valve is used. The reaction vessel is charged with 2000 parts of water into which 200 parts of polyethylene (molecular weight about 180,000) are introduced. The mixture is heated to the boil, while stirring vigorously, in order to displace the air. The vessel is then closed and the temperature raised to 120 to 125° C.

After switching on the radiation source, a quantity of chlorine of 400 parts, calculated for a product of 50% strength, is introduced under pressure. After cooling, 390 parts of chlorinated polyethylene are separated from the hydrochloric acid of about 10% strength by suction-filtering, washed with water and dried. The product obtained contains 49.6% of chlorine.

EXAMPLE 8

30 parts of low pressure polyethylene of an individual grain size of 100 to 120μ (molecular weight 70,000 to 75,000) are wetted with 10 parts of a prechlorinated hydrocarbon fraction (obtained by the hydrogenation of carbon monoxide to yield a hydrocarbon fraction having a boiling range of 170 to 230° C. and subsequent chlorination of the hydrocarbon fraction to a chlorine content of 40%), and introduced into 500 grams of distilled water while adding 0.3 gram of benzoylperoxide. As reaction vessel a 3 times tubulated round-bottom flask of thick-walled glass is used which is provided with a stirrer and with a device for intense cooling and a throttle valve at the outlet side for the exhaust gas.

The well stirred reaction mixture is heated to about 70° C. In the meantime the interior of the reaction vessel is thoroughly rinsed with chlorine and the throttle valve at the outlet side is then closed. The reaction proper is completed in the course of 6 hours at a pressure of chlorine of 0.3 atmosphere (gauge).

The product obtained by the chlorination is separated from the accompanying acid by filtration and dried. It is snow-white and substantially completely powdery and has a chlorine content of 45.6% exclusive of the chloroparaffin portion. By dissolution in trichlorethylene and subsequent precipitation with petroleum ether the product can be divided into a number of fractions.

The following result was ascertained by the fractionation:

| No. of the fraction | Percentage | Chlorine content, percent |
|---|---|---|
| 1 | 23.7 | 48.3 |
| 2 | 17.7 | 44.0 |
| 3 | 22.0 | 42.0 |
| 4 | 17.8 | 40.4 |
| Extraction residue (chlorparaffin portion) | 18.8 | 64.9 |

EXAMPLE 9

30 parts of low pressure polyethylene of an individual grain size of 120 to 150μ but otherwise having the same properties as the material used in the preceding example, are mixed with the same amount of the same chlorparaffin described in Example 8. The mixture is then reacted with chlorine for 6½ hours as described above. The product obtained by the chlorination has a chlorine content of 41.6% (exclusive of the chloroparaffin portion) and shows the following composition:

| No. of the fraction | Percentage | Chlorine content, percent |
|---|---|---|
| 1 | 48.6 | 45.5 |
| 2 | 15.4 | 37.7 |
| 3 | 22.3 | 34.7 |
| 4 | 13.7 | 35.6 |

As can be clearly seen from the tables given in Examples 8 and 9 the products of the individual fractions have approximately equal chlorine contents.

EXAMPLE 10

In a three-necked, thick-walled and round-bottomed flask having a capacity of 4 litres there are suspended in 2.5 litres of an about 50% solution of calcium chloride at a temperature below 100–110° C. 200 grams of a low pressure polyethylene chlorinated at 80–85° C. to a chlorine content of 30.6% and having a molecular weight of about 65,000 and the whole is chlorinated under a pressure of 2 metres of a water column above atmospheric pressure and at a temperature of 120° C. in the presence of an ultra-violet immersion heater as source of radiation. After 27 hours a total amount of chlorine of 43.7% is taken up. The product obtained in the form of elastic but still highly friable granules is washed until it is free of chlorine ions, and then dried at 70° C.

EXAMPLE 11

In the apparatus described in Example 10, 200 parts of a polyethylene (molecular weight about 80,000) are suspended in 1250 parts of water and chlorinated under a pressure of 0.3 atmosphere gauge at room temperature in the presence of an ultra-violet radiator. 273 parts of chlorine are consumed in the course of 45 minutes. The product is suction-filtered and washed with water. It has a chlorine content of 40.5% and represents a hard powder. This powder is suspended in 2500 parts of an about 50% solution of calcium chloride and chlorinated at 110–115° C. for 7 hours with the addition of 0.1% of benzoyl peroxide. After cooling, suction-filtering, washing and drying an elastic, friable product is obtained having a chlorine content of 47.1%.

EXAMPLE 12

In the apparatus described in Example 10, 300 grams of a low pressure polyethylene having an initial molecular weight of about 80,000 which has been prechlorinated to a chlorine content of 61.4% is suspended in 2000 grams of a 43% solution of calcium chloride and treated with chlorine in the presence of 0.15 gram of benzoyl peroxide as catalyst at 125° C., while stirring well, under a pressure of 3 metres of a water column above atmospheric pressure until 63.4% of chlorine are taken up. After having been washed and dried the amorphous, snow-white and powdery product so obtained dissolves without residue in trichlorethylene and carbon tetrachloride.

EXAMPLE 13

In an enamelled, pressure-resistant vessel having a capacity of 40 litres 2.35 kilograms of a low pressure polyethylene having an initial molecular weight of about 65,000 which has been prechlorinated to a chlorine content of 57.2% are suspended in 27 litres of water and, after having been heated to 121° C., the amount of chlorine necessary to obtain a 60% product, i.e. about 300 grams, is introduced under an initial chlorine pressure of 6 atmospheres gauge. The operation is terminated in less than 1 hour.

The product worked up as described in Example 12 is well soluble in trichlorethylene and other chlorinated hydrocarbons, such as chloroparaffins and chlorinated diphenyl.

EXAMPLE 14

A practically straight-chain, low pressure polyethylene having a density of 0.96, a melting index of 5.0 and a grain size of about 30–100μ on the average is prepared in the presence of metal oxides of Group VI of the Periodic Table as catalyst. 200 grams of said low pressure polyethylene are dispersed in 2000 grams of water and reacted with chlorine for 58 hours under a pressure of 0.35 atmosphere gauge and at a temperature of 50–60° C. in the presence of 0.2 gram of benzoyl peroxide and 1 gram of the sodium salt of a perchlorinated alkane-sulfonic acid as emulsifier under the simultaneous action of ultraviolet light. 450 grams almost the theoretical yield of a fine-grained mass is obtained mainly consisting of crystallites which has a chlorine content of 57.8%. The reaction product is only partially soluble in cold trichlorethylene, methylene chloride, aromatic compounds or esters or may be swollen to a smaller or larger extent in said substances.

200 grams of the reaction product are suspended in 2000 grams of an about 50% solution of calcium chloride and treated at 120° C. in a second reaction stage in the presence of 0.2 gram of benzoyl peroxide with a current of gaseous chlorine of 120 grams of $Cl_2$/hour. By suitably throttling the hydrogen chloride escaping together with the unreacted chlorine and by an appropriate addition of chlorine (the partial pressure of the chlorine amounts to 0.25 atmosphere gauge) care is taken to maintain a constant superatmospheric pressure in the apparatus. The final product obtained after a further reaction period of 10 hours has a chlorine content of 62.7% and only slightly coarser grains than the product of the first stage. In contradistinction to the chlorination product of the first reaction stage which contains 57.8% of chlorine, the final product is soluble in the cold in trichlorethylene, methylene chloride, aromatic compounds and esters to yield a practically limpid solution. The films cast from said solution are highly flexible.

EXAMPLE 15

A low pressure polyethylene having a density of 0.96, a melting index of 5.0 and a grain size of about 30–100μ on the average is prepared in the presence of metal oxides of Group VI of the Periodic Table as catalyst. 200 grams of said polyethylene are dispersed in 2500 grams of water and reacted with chlorine in the presence of 0.2 gram of benzoyl peroxide while continuously stirring under a pressure of 0.25–0.3 atmosphere gauge. The reaction temperature is 117–120° C. In the course of 11½ hours altogether a rubber-elastic final material is obtained having a chlorine content of 39.8% which product conglomerates into coarser grains. The yield of dry substance amounts to 320 grams.

EXAMPLE 16

200 grams of a low pressure polyethylene having an average molecular weight of 120,000 and a grain size of 20–50μ on the average are suspended in 1250 grams of water and exposed in a round flask having a capacity of 2 liters and provided with an effective stirrer and reinforced glass walls to the action of two ultra-violet immersion burners which are well cooled with air. By the simultaneous irrigation of the reaction vessel with cooling water care is taken that the internal temperature of the batch does not exceed about 40° C. 710 grams of chlorine are consumed in the course of 6 hours, the chlorine is used under a pressure of 0.35 atmosphere gauge. The fine-grained final product obtained after the reaction is complete in an almost quantitative yield has a chlorine content of 64.0%.

EXAMPLE 17

450 parts of a low pressure polyethylene having a molecular weight of about 50,000–65,000 of which the individual grains have an average size of 20μ are suspended with the addition of 2.0 grams of benzoyl peroxide in 3500 parts of water and treated, as described in the preceding examples, with gaseous chlorine for 110 hours at 85° C. under a chlorine pressure of 0.3 atmosphere gauge. The suspension thus obtained of the fine-grained chlorination product is treated as usual by filtering with suction and drying of the portion of the solid substance. The solid substance contains 72.5% of chlorine and is soluble in the cold in trichlorethylene in any proportion to yield a clear solution in contradistinction to the chlorination product containing less than 70% of chlorine which has been prepared in an analogous manner from the same starting material.

EXAMPLE 18

A vessel provided with a stirrer and a chlorine resistant lining having a capacity of about 1½ cubic meters is charged with 25 kilograms of a low pressure polyethylene having an average molecular weight of 80,000 and an individual grain size of 20–60μ and 750 kilograms of water with the addition of 80 grams of benzoyl peroxide as catalyst. The mixture is treated with gaseous chlorine for 4 hours at 70° C. The initial pressure is 0.1 atmosphere gauge which is gradually raised in the course of the reaction to 0.2–0.25 atmosphere gauge. The chlorination being complete the final product is separated. It represents a fine-grained substance mainly consisting of crystallites which contains 59.0% of chlorine. In order to eliminate the still adhering hydrochloric acid the product is washed several times with water, then once with a 3% soda solution and the foreign ions still present are removed by washing repeatedly with water.

EXAMPLE 19

In the apparatus described in Example 8, 30 parts by weight of a low pressure polyethylene having an approximate molecular weight of 70,000–80,000 and a grain size of 120–130μ are suspended in the absence of chloroparaffin in 250 grams of water and reacted with gaseous chlorine at 60–70° C. under a pressure of 0.3 atmosphere gauge. The fractionation of the washed and dried product obtained after a reaction period of 12 hours (chlorine content 45%) gives the following result:

| No. of the fraction | Portions in percent | Chlorine content, percent |
| --- | --- | --- |
| 1 | 24.2 | 35.0 |
| 2 | 18.5 | 39.9 |
| 3 | 33.0 | 43.6 |
| 4 | 24.3 | 49.4 |

We claim:
1. A process for the manufacture of chlorinated polyethylene which comprises suspending substantially linear polyethylene having a high degree of crystallinity in 3–30 parts by weight of water for each part by weight of polyethylene, treating this polyethylene with chlorine in a first stage at a temperature between 50–110° C. up to a chlorine content of at least 10 percent by weight of the polyethylene, and terminating the chlorination in a second stage at a temperature between 110–150° C.

2. The process of claim 1, wherein the chlorination is carried out in the first stage in such a manner that a product is formed which contains 25–65 percent of chlorine by weight of the polyethylene.

3. A process for the manufacture of chlorinated polyethylene which comprises suspending substantially linear polyethylene having a high degree of crystallinity in 3–30 parts by weight of water for each part by weight of polyethylene, treating this polyethylene with chlorine in a first stage at a temperature between 50–110° C. up to a chlorine content of at least 10 percent by weight of the polyethylene and terminating the chlorination in a second stage at a temperature between 110° C.–150° C., said chlorine being under a pressure in the range from 0.1–10 atmospheres gauge.

4. The process of claim 1, wherein the reaction medium is intimately mixed during at least one stage of the chlorination.

5. The process of claim 1, wherein the polyethylene has been deposited on inert material for polyethylene.

6. The process of claim 1, wherein the chlorination is carried out in the presence of a chlorination catalyst.

7. A process for the manufacture of chlorinated polyethylene which comprises suspending polyethylene having substantially a linear structure and a substantially high degree of crystallinity in about 2.8 to 42 parts by weight of water for each part by weight of polyethylene, treating this polyethylene with chlorine in a first stage at a temperature between 50–110° C. up to a chlorine content of at least 10% by weight of the polyethylene and terminating the chlorination in a second stage at a temperature between 110–150° C.

8. A solid mixture comprising an inert carrier for polyethylene and solid amorphous chlorinated polyethylene of more than 10% chlorine content by weight of the polyethylene, said chlorinated polyethylene having been obtained by chlorinating substantially linear polyethylene deposited on an inert carrier for polyethylene and of a high degree of crystallinity and a molecular weight in the range from 12,000 to 2,000,000 in part at a temperature in the range from 110° C. to 150° C.

9. A solid mixture comprising polyvinyl chloride as an inert carrier for polyethylene and solid amorphous chlorinated polyethylene of more than 10% chlorine content by weight of the polyethylene, said chlorinated polyethylene having been obtained by chlorinating substantially linear polyethylene deposited on polyvinyl chloride and of a high degree of crystallinity, and a molecular weight in the range from 12,000 to 2,000,000 in part at a temperature in the range from 110° C–150° C.

10. A process for the manufacture of chlorinated polyethylene which comprises suspending granular polyethylene having predominantly a linear molecular structure, a high degree of crystallinity, a molecular weight in the range from 12,000 to 2,000,000 and an individual grain diameter of 0.1–300 microns, in 2.8–42 parts of water for each part of polyethylene and contacting this suspended polyethylene at a temperature above 100–110° C. with chlorine, the said minimum temperature depending on the molecular weight of polyethylene in such a way that the higher temperature is employed with the polyethylene of the higher molecular weight, whereby the polyethylene may be chlorinated to a chlorine content up to 70% by weight without the formation of clumps in the suspension.

11. A process of claim 10 wherein the individual grain diameter of the granular polyethylene is between 0.1 to 30 microns, and the chlorination is conducted under an excess pressure of chlorine.

12. The process for the manufacture of solid chlorinated polyethylene which comprises suspending solid granular polyethylene having predominantly a linear molecular structure, a high degree of crystallinity, a molecular weight in the range from 12,000 to 2,000,000 and an individual grain diameter of 0.1–300 microns, in 3 to 30 parts of water for each part of polyethylene and contacting this suspended polyethylene with chlorine at a temperature in the range from 100 to 110° C., as a lower limit, to 150° C. as the upper limit, the chlorinated polyethylene formed at this temperature being non-crystalline, the lower temperature limit depending on the molecular weight of polyethylene in such a way that the higher temperature is employed with the polyethylene of the higher molecular weight, whereby the polyethylene may be chlorinated to a chlorine content of up to 70% by weight.

13. A process for the manufacture of solid chlorinated polyethylene which comprises suspending solid granular polyethylene having predominantly a linear molecular structure, a high degree of crystallinity, a molecular weight in the range from 12,000 to 2,000,000 and an individual grain diameter of 0.1–300 microns, in 3 to 30 parts of water for each part of polyethylene and contacting this suspended polyethylene with chlorine at a temperature in the range from 100 to 110° C., as a lower limit, to 150° C. as the upper limit, the said minimum temperature depending on the molecular weight of polyethylene in such a way that the higher temperature is employed with the polyethylene of the higher molecular weight, under catalytic influence, whereby the polyethylene may be chlorinated to a chlorine content of up to 70% by weight.

14. Process of claim 12 wherein the polyethylene suspension contains a monomeric compound which is liquid under the chlorination conditions, contains at least 6 carbon atoms and is selected from the group consisting of aliphatic, cycloaliphatic, and aromatic hydrocarbons, and chlorination products thereof, said compound serving to promote the diffusion of the chlorine into the polyethylene.

15. Process of claim 12 wherein an electrolyte is included in the aqueous dispersion to raise its boiling point so as to prevent evaporation of the water.

16. A process for the manufacture of solid chlorinated polyethylene which comprises suspending solid granular polyethylene having predominantly a linear molecular structure, a high degree of crystallinity, and a molecular weight in the range from 12,000 to 2,000,000 and an individual grain diameter of 0.1–300 microns, in 2.8–42 parts of water for each part of polyethylene, said polyethylene suspension containing an inert material which is retained in the final product, and contacting this suspension with chlorine at a temperature in the range from 100 to 110° C., as a lower limit, to 150° C. as the upper limit, the said minimum temperature depending on the molecular weight of polyethylene in such a way that the higher temperature is employed with the polyethylene of the higher molecular weight, whereby the polyethylene may be chlorinated to a chlorine content up to 70% by weight without the formation of clumps in the suspension, said inert material serving to prevent particle agglomeration at the beginning of chlorination.

17. Process of claim 16 wherein the inert material is polyvinyl chloride.

18. A solid chlorination product of a polyethylene having a molecular weight of 12,000 to 2,000,000 and individual grain diameter of 0.1–300 microns, said chlorination product having predominantly linear molecular structure and being noncrystalline, said product being obtained by chlorinating a predominantly linear, highly crystalline polyethylene in an aqueous suspension at a temperature in the range from 100–110° C. of lower limit to 150° C. as the upper limit.

References Cited by the Examiner
UNITED STATES PATENTS

| | | | |
|---|---|---|---|
| 2,389,803 | 4/1946 | Myles et al. | 260—94 |
| 2,503,252 | 4/1950 | Ernsberger | 260—94 |
| 2,592,763 | 4/1952 | Taylor | 260—94 |
| 2,695,899 | 11/1954 | Becker et al. | 260—94 |
| 2,906,743 | 9/1959 | Heitzer et al. | 260—94 |
| 2,913,449 | 11/1959 | Hoerger et al. | 260—94 |

OTHER REFERENCES

Polythene: by Renfrew et al. Iliffe and Sons, London, 1957.

Polyethylene: by Raff et al. Interscience Publishers, Inc., New York, 1956.

MURRAY TILLMAN, *Primary Examiner.*

B. E. LANHAM, J. FROME, D. ARNOLD, L. J. BERCOVITZ, *Examiners.*